United States Patent [19]

Psenka et al.

[11] 3,960,055
[45] June 1, 1976

[54] SHAVING CUTTER FOR FINISHING GEARS

[75] Inventors: Joseph A. Psenka, Bloomfield Hills; Richard W. Tersch, Grosse Pointe Woods, both of Mich.

[73] Assignee: Lear Siegler, Inc., Santa Monica, Calif.

[22] Filed: Jan. 28, 1974

[21] Appl. No.: 437,538

Related U.S. Application Data

[63] Continuation-in-part of Ser. No. 270,678, July 11, 1972, Pat. No. 3,803,977.

[52] U.S. Cl. .................................. 90/1.6 A; 90/8
[51] Int. Cl.² .......................................... B23F 19/08
[58] Field of Search ............... 90/1.6 A, 1.6 R, 10, 90/8; 29/103 B, 103 C, 95.1

[56] References Cited
UNITED STATES PATENTS

| | | | |
|---|---|---|---|
| 579,570 | 3/1897 | Fellows | 29/103 B X |
| 1,986,793 | 1/1935 | Chapman et al. | 90/3 |
| 2,194,595 | 3/1940 | Hart | 90/10 |
| 2,282,193 | 5/1942 | Lambrix | 90/10 |
| 3,755,867 | 9/1973 | Anthony | 29/95.1 |
| 3,762,006 | 10/1973 | Tersch | 29/95.1 |

FOREIGN PATENTS OR APPLICATIONS

| | | | |
|---|---|---|---|
| 199,459 | 9/1958 | Germany | 90/1.6 A |

*Primary Examiner*—Othell M. Simpson
*Assistant Examiner*—W. R. Briggs
*Attorney, Agent, or Firm*—Whittemore, Hulbert & Belknap

[57] ABSTRACT

A shaving cutter having a circular array of teeth of the same number and approximate size as that of a gear to be shaved, and having cutting edges at one end of the teeth of identical profile as that to be formed on the gear teeth, the teeth of the cutter being backed off to provide cutting clearance and dimensioned to be received simultaneously in all of the tooth spaces of the gear with circumferential clearance. Relative reciprocation is provided with timed relative circumferential depth feed to shave first one side and then the other of the gear teeth. The teeth are provided with cutting edges occupying different planes to avoid having all teeth initiate cutting action at the same time.

2 Claims, 15 Drawing Figures

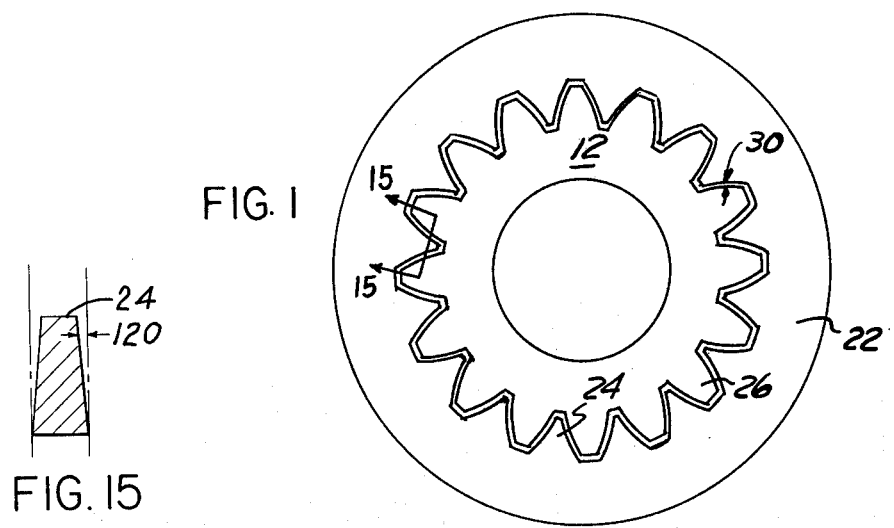
FIG. 1
FIG. 15
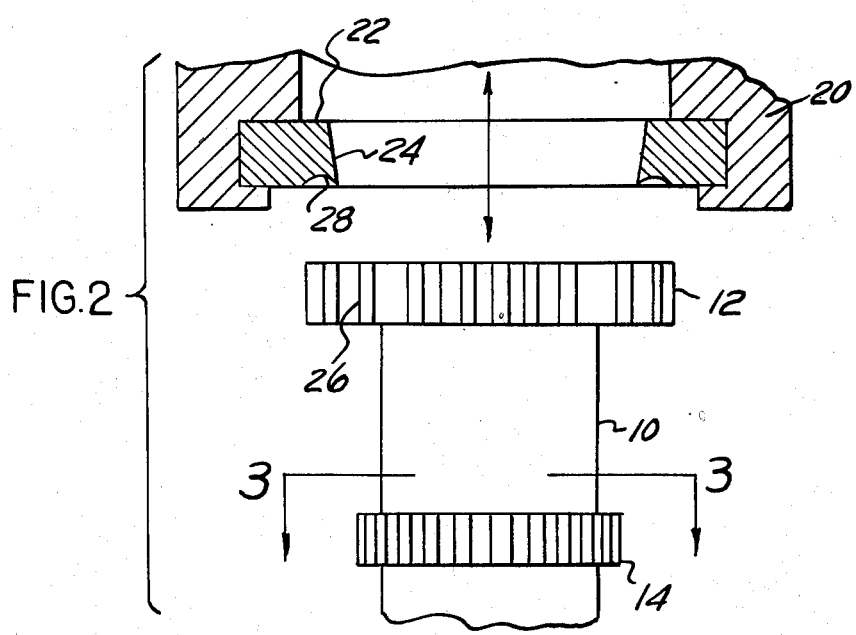
FIG. 2
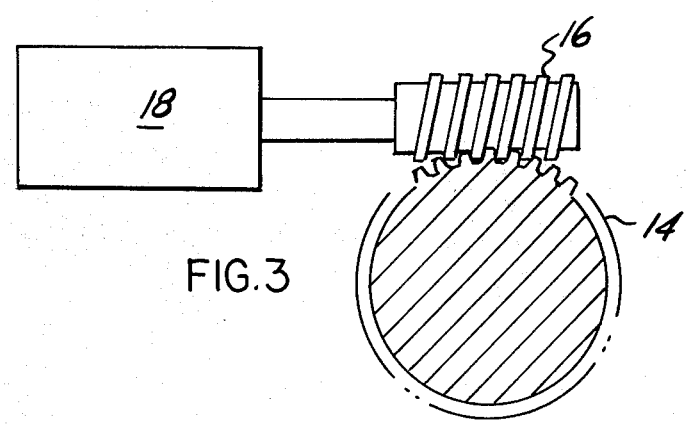
FIG. 3

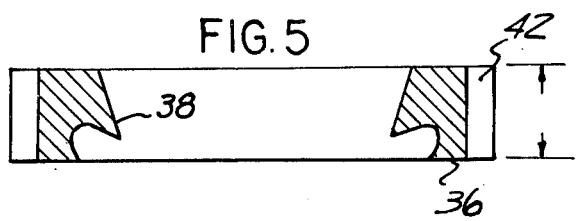
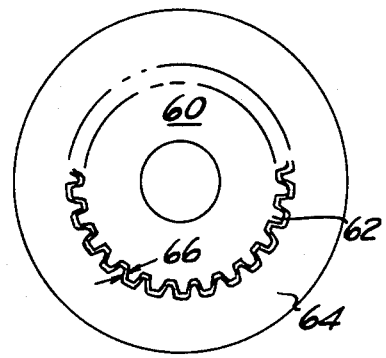
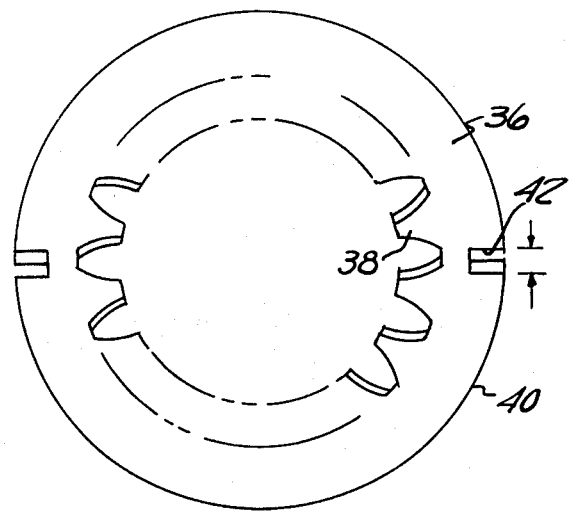
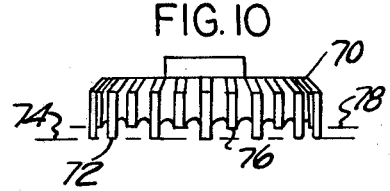
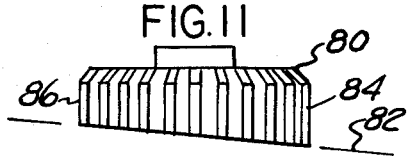
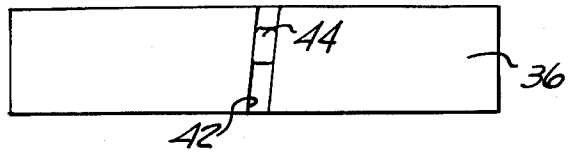
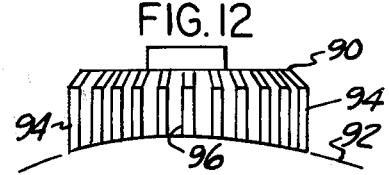
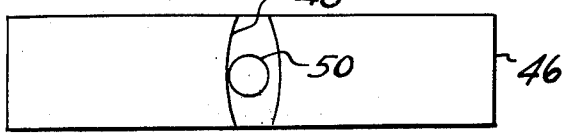
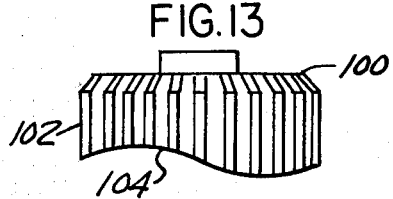
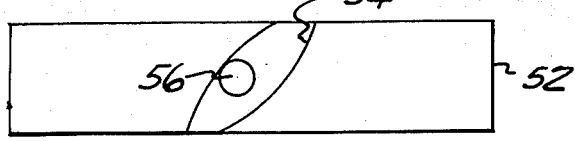
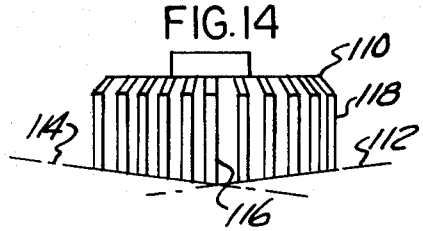

SHAVING CUTTER FOR FINISHING GEARS

CROSS-REFERENCE TO RELATED APPLICATION

The present application is a Continuation-in-Part of our copending application Ser. No. 270,678, filed July 11, 1972 now U.S. Pat. No. 3,803,977.

BRIEF SUMMARY OF THE INVENTION

The teeth of a work gear are finished by an operation in which the profiles of the teeth are shaved from one end of the teeth to the other, all of the teeth surfaces at one side of the teeth being shaved simultaneously, after which the surfaces at the other side of all teeth are shaved simultaneously.

The foregoing may be accomplished using an internally toothed shaving cutter for shaving the teeth of an external gear, or using an externally toothed tool for shaving the teeth of an internal gear. The operation may be carried out to shave the teeth of spur or helical gears. In addition, a relative rotational movement in timed relation to the cutting stroke may be provided in order to form crowned teeth.

The cutter has a circular array of teeth identical in number to the number of teeth in the gear to be shaved and of approximately the same size although slightly smaller in circumferential dimension or thickness so as to provide circumferential clearance. All of the teeth of the cutter are provided with cutting edges formed by the intersection between one end surface of the teeth and both sides thereof. The sides of the teeth in back of the cutting edge are backed off or relieved to provide cutting clearance. The cutting edges are identical in shape with the desired profile on the teeth of the gear.

The shaving operation is carried out by positioning the cutter coaxially of the gear with the teeth of the cutter in alignment with the tooth spaces of the gear. A relative reciprocation is then provided axially of the gear and cutter of an amplitude sufficient to cause the profile cutting edges of the cutter teeth to move over the corresponding surfaces of the gear teeth from one end thereof to the other. A relative circumferential depth feed is provided, preferably incrementally between the termination of a return stroke and the initiation of a cutting stroke. After corresponding sides of all teeth have been shaved simultaneously to predetermined depth, the direction of relative circumferential feed is reversed and the opposite sides of all gear teeth are shaved simultaneously to the required depth.

The apparatus may include means for guiding the relative reciprocation in such a way as to finish either spur or helical teeth and if desired, to provide a crowned formation to the teeth.

BRIEF DESCRIPTION OF THE DRAWINGS

FIG. 1 is a plan view showing an internally toothed cutter matched with an external gear.

FIG. 2 is a transverse sectional view through the cutter, showing its operative relationship to the work support.

FIG. 3 is a diagrammatic sectional view on the line 3—3, of FIG. 2.

FIG. 4 is a diagrammatic plan view of a cutter.

FIG. 5 is a transverse sectional view through a cutter.

FIGS. 6, 7 and 8 are side views of cutters showing various guide formations.

FIG. 9 is a plan view showing an externally toothed cutter received in an internal gear.

FIGS. 10–14 are elevational views showing modifications of the cutter of FIG. 9.

FIG. 15 is a fragmentary section through a cutter tooth.

DETAILED DESCRIPTION

The present invention is applicable in finish shaving either internal or external gears having either spur or helical teeth, and if desired, provided with crowned or tapered teeth.

Referring first to FIGS. 1–3 there is shown a work support 10 adapted to support a work gear 12 thereon in fixed position but for rotation about its axis, which in the illustrated position is vertical. The rotary work support 10 is provided with means for effecting a controlled rotation thereof and this means is diagrammatically indicated as comprising a worm gear 14 in mesh with a worm 16 adapted to be driven from a motor 18. Mounted above the work support 10 is a vertically movable tool support 20 which is herein illustrated diagrammatically as carrying a finish shaving cutter 22.

The cutter 22, which is diagrammatically indicated in FIG. 1, has a multiplicity of radially inwardly extending teeth 24 equal in number and approximate size to the teeth 26 of the work gear 12. The teeth 24 are provided with cutting edges formed by the intersection between the side surfaces of the teeth and the front face thereof. The front face of the teeth, as best indicated in FIG. 2, is provided with an inclined surface 28 and it will be understood that the sides of the teeth are backed off as conventional to provide cutting clearance, as indicated in exaggerated amount at 120 in FIG. 15.

The cutting edges of the cutter teeth are formed with the identical profile, involute or otherwise, desired to be formed on the teeth of the gear 12. In use the cutter 22 and the gear 12 are positioned in coaxial relationship and the tooth thickness of the front or cutting end of the teeth 24 of the cutter 22 are of a circumferential dimension at any diameter somewhat less than the circumferential dimension of the tooth space in the gear 12 at the same diameter. Accordingly, when the cutter is first moved over the gear in the relationship suggested in FIG. 1, circumferential clearance exists between the teeth of the cutter and gear as indicated at 30.

In finish shaving spur teeth 26 of the gear 12, as suggested in FIGS. 2 and 3, the tool support 20 may be considered as part of a vertical movable ram which is reciprocated without rotation, and the cutter 22 is held without rotation in the work support 20. Upon reciprocation of the cutter vertically as seen in FIG. 2, the teeth of the cutter move through the tooth spaces of the work gear. A relative circumferential feed is provided, preferably by rotating the work gear through the medium of the worm 16 and worm gear 14. This rotation may be controlled by suitable control circuits for the motor 18 or the motor 18 may be a suitable standard reversible stepping motor and may be such as to position a cutting edge at one side of all of the teeth of the cutter 22 in proper relation to take a small cut in the same sides of all teeth of the gear at the first stroke. Preferably, on the back stroke the motor is slightly reversed to introduce clearance to avoid causing the cutting edges at the ends of the cutter teeth to drag over the cut surface. Prior to initiation of the succeeding cut the motor 18 is again reversed to provide a slight incremental feed to position the cutter for a second cutting stroke at a slightly increased depth.

It will be observed that this operation provides a full form finishing cut over the entire surface at one side of all of the gear teeth. A very few successive cuts will be sufficient to provide the proper formation and correction of errors at one side of all of the teeth.

Thereafter, prior to initiation of a successive cutting stroke, the motor 18 is reversed through a predetermined degree of movement to position the cutter teeth 24 in position to initiate cutting at the opposite sides of all of the gear teeth 26. The operation is then continued through a few strokes until the other side of the gear teeth has likewise been finished to the required accuracy.

Referring now to FIGS. 4–8 there is diagrammatically indicated arrangements for cutting helical teeth and for crowning either spur or helical teeth. In FIGS. 4 and 5 there is shown a cutter 36 having internal cutting teeth 38 which may be identical with the teeth 24 previously described except that they are disposed at a helix angle in accordance with the desired helix angle to be formed on the teeth of the gear. The otherwise cylindrical outer surface 40 of the cutter is provided at opposite sides with helically extending slots 42, these slots being also indicated in FIG. 6.

The cutter 36 may be reciprocated vertically by a suitable holder, such for example as the holder indicated diagrammatically at 20 in FIG. 2, except that in a stationary position adjacent the path of movement of the cutter there are provided guide fingers 44 which extend into the inclined slots 42. Where this construction is provided in association with the holder 20 illustrated in FIG. 2, it will of course be apparent that suitable gaps in the holder are provided to permit the fingers 44 to extend into the inclined slots. Accordingly, upon vertical reciprocation of the holder, the cutter 36 will be given equivalent vertical movement upon which is superimposed a circumferential or rotational movement dependent upon the inclination of the guide slot 42. This of course will cause the cutting teeth of the cutter to move in a helical path which is chosen to correspond precisely to the helical arrangement of the teeth of the external gear with which the cutter 36 is associated.

Instead of providing an inclined slot 42, a cutter 46 may be provided with a slot 48 adapted to receive a guide pin 50. The opposite sides of the guide slot 48 are oppositely curved, and generally arcuate or at least curvilinear and upon vertical movement of the cutter 46 with respect to the stationary guide pin 50, will cause a back and forth increment of rotation of the cutter during the cutting stroke. This will provide a crowning configuration on spur teeth. The cutter is rotationally biased as by spring means into engagement with one side or the other of slot 48, according to which side of the gear teeth is being shaved.

A cutter 52, illustrated in FIG. 8, is similar except that the grade slot 54 associated with a stationary guide pin 56 is inclined so that the motion imparted to the cutter 52 corresponds generally to the disposition of helical teeth on the gear but the oppositely curved shape of the guide slot 54 at opposite sides thereof is adapted to provide a back and forth increment of rotation which will provide a crowned configuration on the generally helical teeth of the work gear. Again, the cutter is rotationally biased in one direction while cutting one side of the teeth in the opposite direction while cutting the other side. The sides of the slots 48 and 54 may be concave, or convex.

Referring now to FIG. 9 there is diagrammatically illustrated an arrangement in which the cutter, here designated at 60, has external teeth 62 adapted to be received within tooth spaces of an internally toothed work gear 64 with initial clearance as indicated at 66.

In general terms, the operation of this cutter is exactly the same as of the internally toothed cutter previously described. The teeth of the cutter again are provided with cutting edges at one end and the sides of the teeth are backed off to provide cutting clearance. Again, suitable camming means equivalent to the guide slots described in conjunction with FIGS. 5–8, may be employed to provide either helical movement or crowning movement or both of the cutter, the teeth of the cutter being inclined where the finishing action is impaired to a helical gear.

In FIGS. 10–14 there is illustrated an arrangement of teeth, provided for the purpose of eliminating simultaneous contact of all of the teeth of the cutter with the ends of the teeth of the work gear. It will of course be understood that the modification illustrated in FIGS. 10–14 in connection with an external cutter is equally applicable to an internally toothed cutter such as illustrated at 22 in FIG. 1.

Referring first to FIG. 10 the cutter 70 is provided with a multiplicity of teeth 72, the cutting faces of which are located symmetrically with respect to a plane 74 perpendicular to the axis of the cutter. The remaining teeth 76, which in this Figure are illustrated as alternate teeth each of which is interposed between one of the teeth 72, are all located symmetrically with respect to a second plane 78 which is spaced axially from the plane 74. Accordingly, upon initiation of a cutting stroke, which is downwardly as seen in FIG. 10, alternate teeth 72 will initially contact the teeth of the work gear, and upon further movement thereof the remaining teeth 76 will contact the teeth of the work gear. This will reduce the impact and will produce a much smoother and more efficient cutting operation.

Referring now to FIG. 11 the cutter 80 has the cutting teeth located symmetrically with respect to an inclined plane 82. With this arrangement the teeth having the maximum axial extent as indicated diagrammatically at 84, will contact the teeth of the work gear first and the action of the teeth will extend progressively around the cutter in both directions until the tooth 86 having the minimum axial extension engages the work piece. This arrangement has the objection that the cutting action is not balanced around the cutter.

Referring now to FIG. 12 the cutter 90 has the teeth arranged symmetrically with respect to a cylindrical surface 92 so that teeth 94 at opposite sides of the cutter engage initially and the cutting action extends progressively from tooth to tooth to the diametrically opposed teeth one of which is illustrated at 96.

In FIG. 13 a somewhat different arrangement is illustrated for the cutter 100, the ends of the teeth 102 being arranged in a sinuous curve 104 so that the cutting edge extends progressively from the longer teeth toward the shorter teeth.

FIG. 14 shows a cutter 110 in which the ends of the teeth at one side thereof are located symmetrically with respect to a plane 112 and the teeth at the other side of the cutter are located symmetrically with respect to a plane 114. With this arrangement teeth 116 at diametrically opposite sides of the cutter engage the work equally and the cutting action extends progressively from these teeth toward the teeth 118 located at 90° from the teeth 116.

It will of course be understood that the inclination of the faces of teeth, or rake, as well as the back-off angle must be taken into account to provide a cutting edge shaped to produce the correct profile on the gear teeth. This results in a cutting edge whose projection into a plane perpendicular to the advance of the tooth cuts the groove or space to the required shape. This may be called the effective or cutting profile of the tooth.

It is also to be understood that it is not sufficient to initially provide identical teeth with the cutting edges all located symmetrically with respect to a single plane perpendicular to the axis, and then to grind the front faces of some of the teeth to provide the sequential cutting. Due to back-off, this would produce thinner teeth toward the rear of the tool, which would not produce the required dimensions and tooth spacing on the gear.

The individual tooth form must be designed, taking into account tooth location, so that originally and as reground, proper tooth form and spacing in the work gear will be maintained.

The embodiments of the invention illustrated in FIGS. 10–14 all have the advantage that different cutting edges initiate cutting action at different times. In addition to this broad concept, it is also desirable to provide the cutting edges so that the thrust on the tool is balanced. Thus for example, it is apparent that with alternated high and low teeth, as shown in FIG. 10, the teeth 72 will provide a balanced thrust parallel to the axis of the cutter, as will the teeth 76. However, with the embodiment of the invention illustrated in FIG. 11, the teeth at the right of the cutter, as shown, will initiate cutting action prior to the teeth at the left of the cutter and hence, this construction is less desirable.

With the constructions in FIGS. 12, 13 and 14 each tooth initiates its cutting action at the same time as the tooth diametrically opposite thereof. With this arrangement not only is there a progressive increase in the number of teeth cutting, but also the thrusts on the cutter are balanced so that there is no tendency for the cutter to tip.

Instead of having diametrically opposite teeth occupying the same plane perpendicular to the axis of the cutter, other arrangements would be equally effective, such for example as the provision of similarly acting cutting edges located at equal circumferential spacing, such for example as 120°, with the remaining teeth similarly arranged but having cutting edges occupying different planes.

What we claim as our invention is:

1. A gear shaving cutter in the form of a unitary gear body designed simultaneously to perform a shaving action first at one side of all of the teeth of a gear simultaneously for substantially the full height thereof, and then to perform a shaving action at the other side of all the teeth of the gear simultaneously for substantially the full height thereof, said body having a complete circular series of teeth conforming in profile to the profile desired on the finished teeth of the gear, said teeth having a maximum thickness measured circumferentially of the cutter which is less than the circumferential spacing between adjacent gear teeth measured at the same radial distance from the centers of the gear and body, said cutter teeth having cutting edges only at one end thereof and at both sides of the teeth, both sides of the cutter teeth being inclined to provide cutting clearance behind both of the cutting edges, said cutter teeth accordingly being of diminishing thickness from the end thereof provided with said cutting edges to the other, whereby upon relative axial reciprocation between the shaving cutter and gear in coaxial relationship and in one direction only, shaving cuts may be taken from end to end of the gear teeth at one side thereof for substantially the full height thereof and by relative circumferential feed, shaving cuts may be taken at the other side of the gear teeth, the cutting edges of said cutter teeth being disposed at different axial spacings from a single reference plane perpendicular to the axis of the cutter to initiate cuts by different teeth at different times.

2. A cutter as defined in claim 1 in which teeth spaced the same distance from said reference plane are spaced around the cutter so as to provide balanced thrust on the cutter as they initiate simultaneous cuts.

* * * * *